United States Patent
Dwivedi (10) Patent No.: US 12,547,200 B2
(45) Date of Patent: Feb. 10, 2026

(54) PROPORTIONAL TO ABSOLUTE TEMPERATURE VOLTAGE DETERMINATION WITHOUT DYNAMIC ELEMENT MATCHING

(71) Applicant: STMICROELECTRONICS INTERNATIONAL N.V., Geneva (CH)

(72) Inventor: Atul Dwivedi, Benares (IN)

(73) Assignee: STMicroelectronics International N.V., Geneva (CH)

( * ) Notice: Subject to any disclaimer, the term of this patent is extended or adjusted under 35 U.S.C. 154(b) by 83 days.

(21) Appl. No.: 18/750,152

(22) Filed: Jun. 21, 2024

(65) Prior Publication Data

US 2025/0013257 A1    Jan. 9, 2025

Related U.S. Application Data (60) Provisional application No. 63/525,019, filed on Jul. 5, 2023.

(51) Int. Cl.
    *G01K 7/01*     (2006.01)
    *G01K 7/16*     (2006.01)
    *G05F 3/30*     (2006.01)

(52) U.S. Cl.
    CPC .............. G05F 3/30 (2013.01); *G01K 7/01* (2013.01); *G01K 7/16* (2013.01)

(58) Field of Classification Search
    CPC ..... G05F 3/30; G05F 3/20; G05F 3/22; G05F 3/222; G05F 3/225; G05F 3/245;
    (Continued)

(56) References Cited

U.S. PATENT DOCUMENTS 11,268,865 B2    3/2022 Hanano et al.
2004/0252749 A1*  12/2004 Randazzo ............. G01J 5/22
                                                    374/178

(Continued)

FOREIGN PATENT DOCUMENTS

CN    101762338 A    12/2011
CN    207600620 U    7/2018

OTHER PUBLICATIONS

Meijer et al., Temperature sensors and voltage references implemented in CMOS technology, IEEE Sensors Journal, vol. 1, No. 3, pp. 225 234, (Oct. 2001).

(Continued)

*Primary Examiner* — Jung Kim
(74) *Attorney, Agent, or Firm* — Alston & Bird LLP (57) ABSTRACT

An integrated circuit comprises a current source, a plurality of transistors arranged in parallel, a plurality of resistors, a plurality of switches, switch control circuitry, and measurement circuitry. Each resistor is coupled with the emitter of a respective transistor. Each switch selectively couples the current source to a respective resistor such that a bias current flows from the current source to the emitter of a respective transistor when a respective switch is closed. The measurement circuitry is coupled to the first transistor between its emitter and a respective resistor. The measurement circuitry is configured to separately measure a base-emitter voltage (VBE1) of the first transistor when all of the switches are closed and a base-emitter voltage (VBE2) of the first transistor when only the switch associated with the first transistor is closed and to determine a ΔVBE by calculating a difference between VBE2 and VBE 1.

20 Claims, 5 Drawing Sheets

(58) Field of Classification Search
CPC . G05F 3/242; G01K 7/01; G01K 7/16; G01K 7/00; G01R 19/0084
See application file for complete search history.

(56) References Cited

U.S. PATENT DOCUMENTS

| | | |
|---|---|---|
| 2014/0314124 A1 | 10/2014 | Ash et al. |
| 2015/0276497 A1 | 10/2015 | Miyazaki et al. |
| 2022/0120620 A1 | 4/2022 | Lee et al. |

OTHER PUBLICATIONS

Qin et al . . . "An Energy-Efficient BJT-Based Temperature Sensor with ±0.8° C. (3) Inaccuracy from −50 to 150° C." Sensors 22, No. 23: 9381 (Dec. 2022).
R. J. van der Plassche, Dynamic element matching for high-accuracy monolithic D/A converters, IEEE Journal of Solid-State Circuits, vol. SC-11, No. 6, pp. 795 800, Dec. 1976.

\* cited by examiner

PROPORTIONAL TO ABSOLUTE TEMPERATURE VOLTAGE DETERMINATION WITHOUT DYNAMIC ELEMENT MATCHING

CROSS-REFERENCE TO RELATED APPLICATIONS

This application claims priority to and the benefit of U.S. Provisional Patent Application Ser. No. 63/525,019, filed Jul. 5, 2023, and titled "PROPORTIONAL TO ABSOLUTE TEMPERATURE VOLTAGE DETERMINATION WITHOUT DYNAMIC ELEMENT MATCHING," which is incorporated herein by reference in its entirety.

FIELD OF THE INVENTION

Example embodiments of the present disclosure relate generally to electronic circuits and, more particularly, to temperature measurement of an integrated circuit using a proportional to absolute temperature voltage.

BACKGROUND

Applicant has identified many technical challenges and difficulties associated with temperature measurement using a proportional to absolute temperature voltage. Through applied effort, ingenuity, and innovation, Applicant has solved problems related to temperature measurement using a proportional to absolute temperature voltage by developing solutions embodied in the present disclosure, which are described in detail below.

BRIEF SUMMARY

Various embodiments described herein relate to systems, apparatuses, products, and methods for temperature measurement using a PTAT voltage.

In accordance with some embodiments of the present disclosure, an example integrated circuit is provided. In some embodiments, the example integrated circuit comprises a current source, a plurality of transistors arranged in parallel, a plurality of resistors, a plurality of switches, switch control circuitry, and measurement circuitry coupled. Each of the plurality of transistors have an emitter and a base. Each resistor is coupled with the emitter of a respective one of the plurality of transistors. Each switch selectively couples the current source to a respective one of the plurality of resistors such that a bias current flows from the current source to the emitter of a respective one or more of the plurality of transistors when a respective one or more of the plurality of switches is closed. The switch control circuitry is configured to, at different times, cause all of the plurality of switches to close and, separately, cause a switch associated with a first one of the plurality of transistors to close while causing all other switches to open. The measurement circuitry is coupled to the first one of the plurality of transistors between its emitter and a respective one of the plurality of resistors. The measurement circuitry is configured to separately measure a base-emitter voltage (VBE) of the first one of the plurality of transistors when all of the plurality of switches are closed and a VBE of the first one of the plurality of transistors when only the switch associated with the first one of the plurality of transistors is closed. The measurement circuitry is further configured to determine a ΔVBE by calculating a difference between the VBE when only the switch associated with the first one of the plurality of transistors is closed and the VBE when all of the plurality of switches are closed.

In some embodiments, the measurement circuitry is further configured to calculate a temperature based on the determined ΔVBE.

In some embodiments, the measurement circuitry comprises an analog-to-digital converter for converting the determined ΔVBE from an analog value to a digital value.

In some embodiments, each of the plurality of transistors comprises a bipolar junction transistor.

In some embodiments, each of the plurality of bipolar junction transistor comprises a parasitic bipolar junction transistor of the CMOS technology.

In some embodiments, the bias current from the current source is selected to be within an operating region of the plurality of transistors.

In some embodiments, each of the plurality of resistors has a same resistance value.

In some embodiments, the same resistance value is selected such that, when all of the plurality of switches are closed such that the bias current flows through all of the resistors, a difference in the bias current flowing through each one of the plurality of resistors due to a mismatch of its associated transistor is less than a threshold percentage of a nominal bias current through each one of the plurality of resistors.

In accordance with some embodiments of the present disclosure, an example method is provided. In some embodiments, the example method comprises, for a first one of a plurality of transistors arranged in parallel, each of the plurality of transistors having an emitter and a base, the emitter of each of the plurality of transistors selectively coupled to a current source via a respective one of a plurality of switches and a respective one of a plurality of resistors such that a bias current flows from the current source to the emitter of a respective one or more of the plurality of transistors when a respective one or more switches is closed, separately measuring a base-emitter voltage (VBE) when all of the plurality of switches are closed and a VBE when only a switch associated with the first one of the plurality of transistors is closed; determining a ΔVBE for the first one of the plurality of transistors by calculating a difference between the VBE when only the switch associated with the first one of the plurality of transistors is closed and the VBE when all of the plurality of switches are closed; and calculating a temperature using the determined ΔVBE.

In some embodiments, the method further comprises converting each of the measured VBEs from an analog value to a digital value.

In some embodiments, each of the plurality of transistors comprises a bipolar junction transistor.

In some embodiments, the bias current from the current source is selected to be within an operating region of the plurality of transistors.

In some embodiments, each of the plurality of resistors has a same resistance value.

In some embodiments, the same resistance value is selected such that, when all of the plurality of switches are closed such that the bias current flows through all of the resistors, a difference in the bias current flowing through each one of the plurality of resistors due to a mismatch of its associated transistor is less than a threshold percentage of a nominal bias current through each one of the plurality of resistors.

In accordance with some embodiments of the present disclosure, an example temperature sensor is provided. In some embodiments, the example temperature sensor comprises a current source, a plurality of transistors arranged in parallel, a plurality of resistors, a plurality of switches, switch control circuitry, and measurement circuitry. Each of the plurality of transistors has an emitter and a base. Each resistor is coupled with the emitter of a respective one of the plurality of transistors. Each switch selectively couples the current source to a respective one of the plurality of resistors such that a bias current flows from the current source to the emitter of a respective one or more of the plurality of transistors when a respective one or more of the plurality of switches is closed. The switch control circuitry is configured to, at different times, cause all of the plurality of switches to close and, separately, cause a switch associated with a first one of the plurality of transistors to close while causing all other switches to open. The measurement circuitry is coupled to the first one of the plurality of transistors between its emitter and a respective one of the plurality of resistors. The measurement circuitry is configured to separately measure a base-emitter voltage (VBE) of the first one of the plurality of transistors when all of the plurality of switches are closed and a VBE of the first one of the plurality of transistors when only the switch associated with the first one of the plurality of transistors is closed. The measurement circuitry is further configured to determine a $\Delta$VBE by calculating a difference between the VBE when only the switch associated with the first one of the plurality of transistors is closed and the VBE when all of the plurality of switches are closed.

In some embodiments, the measurement circuitry is further configured to calculate a temperature based on the on the determined $\Delta$VBE.

In some embodiments, the measurement circuitry comprises an analog-to-digital converter for converting the determined $\Delta$VBE from an analog value to a digital value.

In some embodiments, each of the plurality of transistors comprises a bipolar junction transistor.

In some embodiments, the bias current from the current source is selected to be within an operating region of the plurality of transistors.

In some embodiments, each of the plurality of resistors has a same resistance value, and the same resistance value is selected such that, when all of the plurality of switches are closed such that the bias current flows through all of the resistors, a difference in the bias current flowing through each one of the plurality of resistors due to a mismatch of its associated transistor is less than a threshold percentage of a nominal bias current through each one of the plurality of resistors.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will also be appreciated that the scope of the disclosure encompasses many potential embodiments in addition to those here summarized, some of which will be further described below.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

With increasing density and operating speeds of integrated circuits (ICs), among other factors, in some contexts it is important monitor the temperature of an integrated circuit. If the temperature gets too high (for example, above 85 degrees Celsius), the IC can be damaged. If the temperature of an IC is sensed to be increasing, remedial actions can be taken to reduce the temperature. For example, in some contexts the remedial actions may include reducing the frequency and/or the voltage of the IC.

One approach that has been used to determine the temperature of an IC uses a proportional to absolute temperature (PTAT) voltage. When using a PTAT voltage for temperature sensing, it is important to be able to determine the PTAT voltage to a desirable accuracy. One approach that has been used to determine PTAT voltage is to calculate the difference between base-emitter voltages of two bipolar junction transistors (BJTs) biased at different current densities. However, the accuracy of this approach is limited by the accuracy of the biasing current ratio, which is sensitive to mismatch errors.

Errors due to mismatch between the current sources and transistors can be reduced by dynamically interchanging them. This technique is referred to as dynamic element matching (DEM). One approach that has been used implements DEM in the current sources biasing the BJTs. Since MOS (metal oxide semiconductor) current sources have very high mismatch to begin with, the residual inaccuracy even after DEM of these current sources may not be low enough. Moreover, the previous attempt to implement DEM in BJTs while using only one current source was prone to switch IR drop mismatch, which further degraded performance.

Various embodiments of the present disclosure overcome the above technical challenges and difficulties and provide various technical improvements and advantages. Various embodiments of the present disclosure provide at least an integrated circuit, method, and temperature sensor that obtain a more accurate $\Delta VBE$. For example, various embodiments of the present disclosure provide an example system for generating a more accurate PTAT voltage without using dynamic element matching, thereby reducing the steps and time it takes to obtain the PTAT voltage. Various embodiments of the present disclosure achieve a PTAT voltage accuracy similar to approaches that use DEM, but more quickly.

Various embodiments of the present disclosure use only one current source, thereby eliminating the current source mismatch. Various embodiments of the present disclosure sample the VBEs (at different current densities) at the emitter of a BJT, thereby avoiding the switch IR drop mismatch. Various embodiments of the present disclosure couple a resistor to the emitter of each of the BJTs, which reduces the effect of BJT mismatch as explained further below.

Various embodiments of the present disclosure measure the VBE of only one BJT, both at a high current density and at a low current density. Various embodiments of the present disclosure obtain the higher current density VBE1 by flowing the entire bias current in that one BJT and obtain the lower current density VBE2 by flowing the bias current across a plurality of such BJTs arranged in parallel (the number of BJTs may vary as described below). Various embodiments of the present disclosure subtract VBE2 from VBE1 to obtain $\Delta VBE$. In various embodiments of the present disclosure, the $\Delta VBE$ value is the PTAT value used for temperature calculation.

Various embodiments of the present disclosure provide a smaller footprint as compared to some approaches that have been used due to fewer components being used (for example, only one current source and no DEM circuitry). Various embodiments of the present disclosure provide a similar accuracy as compared to some DEM approaches that have been used with fewer steps.

Various embodiments of the present disclosure provide a PTAT voltage more quickly as compared to some approaches that have been used, as various embodiments of the invention do not use the additional steps involved in DEM approaches that have been used.

Figure 1:
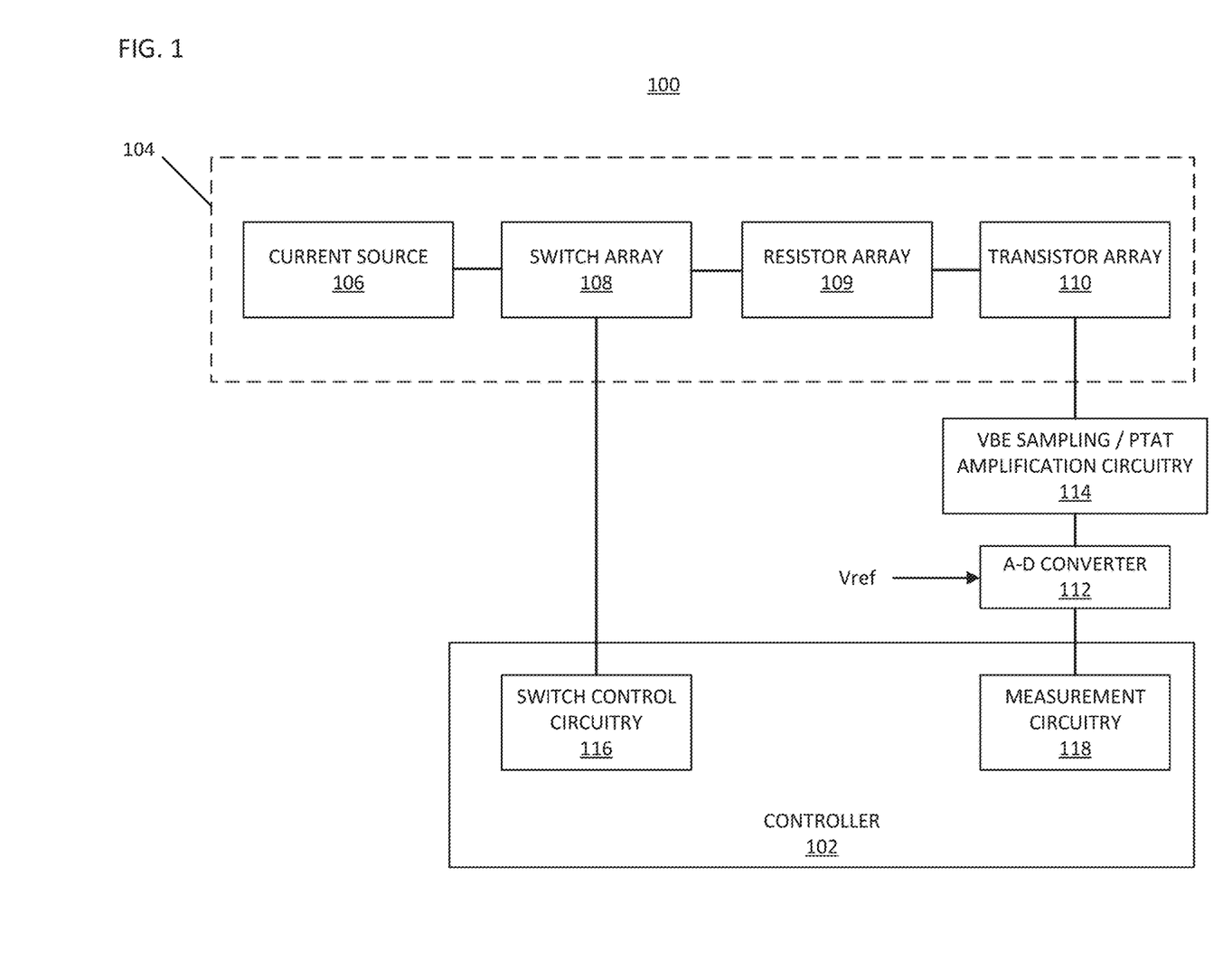
FIG. 1 illustrates a block diagram of an example system for temperature measurement using a proportional to absolute temperature voltage, in accordance with an example embodiment of the present disclosure.

Referring now to FIG. 1, a block diagram of an example system 100 for temperature measurement using a PTAT voltage is illustrated in accordance with an example embodiment of the present disclosure. The example system 100 comprises a controller 102, a circuit 104, a VBE sampling/PTAT amplification circuitry 114, and an analog to digital converter (ADC) 112. The example system 100 may be implemented as part of an IC to perform temperature measurement of the IC. Such an IC may be any IC for which high speed temperature measurement is desirable, such as but not limited to central processing units, graphics processing units, digital signal processors, compute-intensive application specific integrated circuits, and the like.

As described further below in relation to FIG. 2, in some embodiments the circuit 104 comprises a current source 106, a plurality of switches 108, a plurality of resistors 109, and a plurality of transistors 110. In some embodiments, each switch of the plurality of switches 108 selectively couples the current source 106 to a corresponding one of the resistors 109, which in turn is coupled to the emitter of a corresponding one of the plurality of transistors 110 such that a bias current flows from the current source 106 through the respective one or more of the plurality of resistors 109 and to the emitter of a respective one or more of the plurality of transistors 110 when a respective one or more of the plurality of switches 108 is closed.

In some embodiments, each of the plurality of resistors have the same resistance value, as described further below. By selecting a suitable value of resistance for the resistors (as described further below), the current distribution mismatch is reduced to a level at which it can be ignored in some contexts in exchange for the higher speed obtained by not using dynamic element matching.

In some embodiments, the plurality of transistors comprise a plurality of bipolar junction transistors. In some embodiments, the plurality of bipolar junction transistors comprise a plurality of parasitic bipolar junction transistors of the complementary metal-oxide semiconductor (CMOS) technology. In some embodiments, the current source 106 is a single current source. In some embodiments, the bias current from the current source is selected to be within the operating region of the plurality of transistors. In some embodiments, the bias current from the current source is selected to be between the high injection region and the low injection region of the plurality of transistors.

As depicted in FIG. 1, the example system 100 for temperature measurement using a PTAT voltage includes a controller 102. The controller 102 may include one or more processors, input/output circuitry, data storage media, communications circuitry, and/or other components configured to perform compute operations. In some embodiments, the data storage media may be configured to store information, data, content, applications, instructions, or the like, for enabling the controller 102 to carry out various functions. As such, in some embodiments, the controller 102 may be referred to as functional logic. The controller 102 may be embodied in a number of different ways, for example, in some embodiments, the controller 102 may include one or more processing devices configured to perform independently. Additionally or alternatively, in some embodiments, the controller 102 may include one or more processor(s) configured in tandem via a bus to enable independent execution of instructions, pipelining, and/or multithreading. The use of the terms "controller," "processor," and "processing circuitry" should be understood to include a single core processor, a multi-core processor, multiple processors internal to the controller 102, and/or one or more remote or "cloud" processor(s) external to the controller 102.

In an example embodiment, the controller 102 may be configured to execute instructions stored in the data storage media or otherwise accessible to the processor. Alternatively or additionally, the controller 102 in some embodiments is configured to execute hard-coded functionality. As such, whether configured by hardware or software methods, or by a combination thereof, the controller 102 represents an entity (e.g., physically embodied in circuitry) capable of performing operations according to an embodiment of the present disclosure while configured accordingly. Alternatively or additionally, as another example in some example embodiments, when the controller 102 is embodied as an executor of software instructions, the instructions specifically configure the controller 102 to perform the algorithms embodied in the specific operations described herein when such instructions are executed.

In some embodiments, as illustrated in FIG. 1, the controller 102 comprises switch control circuitry 116 and measurement circuitry 118. A bias voltage (not illustrated) biases the current source 106 to source a fixed current value when one or more of the plurality of switches 108 are closed. In some embodiments, the switch control circuitry 116 includes hardware, software, firmware, and/or a combination thereof, for selectively causing each of the plurality of switches 108 to open or close, thereby causing bias current from the current source 106 to, depending on the state of the switches (i.e., open or closed), flow to one or more of the plurality of resistors 109 and in turn to one or more of the plurality of transistors 110, as described further below. In some embodiments, the VBE sampling/PTAT amplification circuitry 114 includes hardware, software, firmware, and/or a combination thereof, for sampling and storing VBE1, VBE2 (such as in a switched capacitor arrangement) and amplifying the PTAT voltage to be fed in the ADC 112 for digitization. In some embodiments, the VBE sampling/PTAT amplification circuitry 114 measures the base-emitter voltage (VBE) of one of the plurality of transistors 110 at a low current density and at a high current density and determines a ΔVBE therefrom, as described further below. In some embodiments, the measurement circuitry 118 includes hardware, software, firmware, and/or a combination thereof, for receiving and storing a digitized PTAT voltage and reference voltage (Vref) from the ADC 112, controlling the timing/sequencing of the VBE sampling/PTAT amplification circuitry 114 and the ADC 112, using the digitized PTAT voltage and reference voltage to calculate a temperature (in degrees C.), and providing a digitized temperature output. For overall high performance, the accuracy of sampling, amplification, and ADC reference should be higher or at least comparable to the accuracy of PTAT voltage generation mentioned in this disclosure.

Although the components are described with respect to functional limitations, it should be understood that the particular implementations necessarily include the use of particular hardware. It should also be understood that certain of the components described herein may include similar or common hardware. For example, two sets of circuitries may both leverage use of the same processor, network interface, storage medium, or the like to perform their associated functions, such that duplicate hardware is not required for each set of circuitries.

The use of the term "circuitry" as used herein with respect to components of the apparatus should therefore be understood to include particular hardware configured to perform the functions associated with the particular circuitry as described herein. The term "circuitry" should be understood broadly to include hardware and, in some embodiments, software for configuring the hardware. For example, in some embodiments, "circuitry" may include processing circuitry, storage media, network interfaces, input/output devices, and the like While the example block diagram of FIG. 1 illustrates an example system 100 for temperature measurement using a PTAT voltage, it is noted that the scope of the present disclosure is not limited to the example system shown in FIG. 1. In some embodiments, an example system for temperature measurement using a PTAT voltage may comprise one or more additional or alternative components.

Figure 2:
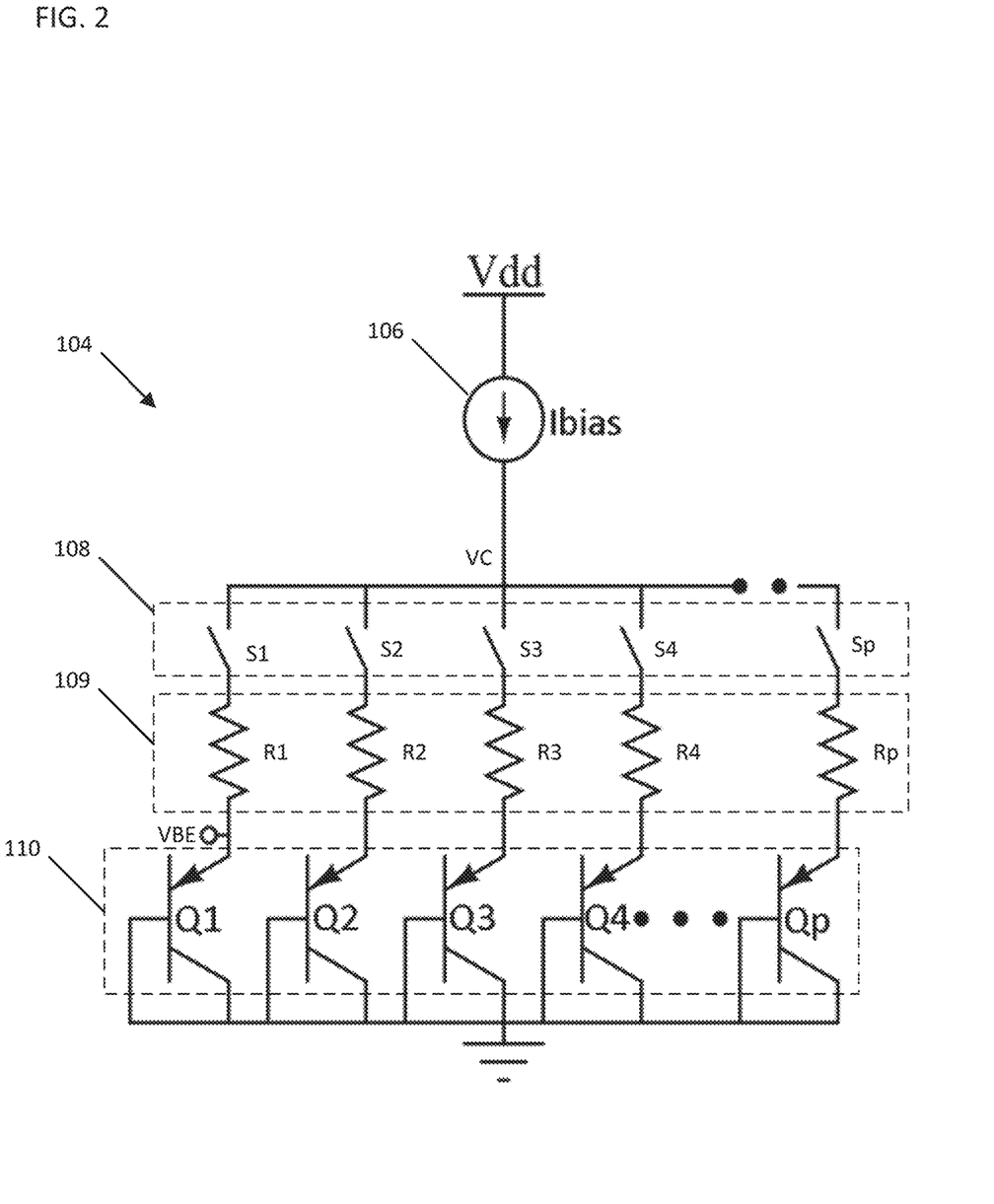
FIG. 2 illustrates a circuit diagram for temperature measurement using a proportional to absolute temperature voltage, in accordance with an example embodiment of the present disclosure.

Referring now to FIG. 2, a circuit diagram for determining a PTAT voltage for determining a temperature is illustrated in accordance with an example embodiment of the present disclosure. As seen in FIG. 2, the circuit 104 comprises a current source 106 coupled to a plurality of parallel branches, each of the parallel branches comprising one of a plurality of switches 108, one of a plurality of resistors 109, and one of a plurality of transistors 110 all in series within their respective branch.

In some embodiments, the number of parallel branches in the circuit 104 may vary. The greater the number of parallel branches, the higher the calculated ΔVBE will be and the higher the signal-to-noise ratio (SNR) will be. In some embodiments, the number of branches is decided as balanced between the area (taken up by BJTs and resistors) versus the SNR. As described herein, the number of parallel branches may be expressed as "p." Each of the plurality of switches 108 selectively couples the current source 106 to a corresponding one of the plurality of resistors 109, each of which is in turn coupled to the emitter of a corresponding one of the plurality of transistors 110. As such, a bias current ("Ibias") flows from the current source 106 through a respective one of the plurality of resistors 109 and to the emitter of a respective one or more of the plurality of transistors 110 when a respective one or more of the plurality of switches 108 is closed. In the illustrated embodiment, each of the plurality of switches 108 is individually labeled as S1 through Sp to indicate the potentially varying number of switches. In the illustrated embodiment, each of the plurality of resistors 109 is individually labeled as R1 through Rp to indicate the potentially varying number of resistors. In the illustrated embodiment, each of the plurality of transistors 110 is individually labeled as Q1 through Qp to indicate the potentially varying number of transistors. As illustrated, switch S1 selectively couples resistor R1 and transistor Q1 to the current source 106, switch S2 selectively couples resistor R2 and transistor Q2 to the current source 106, switch S3 selectively couples resistor R3 and transistor Q3 to the current source 106, and so on. In some embodiments, since each branch has a switch, a resistor, and a transistor, the number of switches, the number of resistors, and the number of transistors will all be the same.

In some embodiments, the resistance value is selected such that, when all of the switches are closed such that the bias current distributes through all of the resistors, a difference in the distributed bias current flowing through each one of the plurality of resistors due to a mismatch of its associated transistor (this current may be termed the "mismatch current" or "Imismatch") is small enough to meet the accuracy of PTAT voltage required. In some embodiments, this determination may be based on a threshold percentage of a nominal bias current (i.e., the current assuming no mismatch, which may be termed "Inominal") through each one of the plurality of resistors. For example, consider an example embodiment in which Ibias equals 1 microampere (uA), there are eight parallel branches (i.e., eight switches, eight resistors, and eight transistors), and the maximum VBE mismatch (from VBEavg) over the eight branches is 1 millivolt (mV). In such an example embodiment, the nominal current through each resistor is Ibias divided by eight (1 µA/8) which equals 125 nanoamperes (nA). In such an example embodiment, assume that the threshold percentage is five percent (6.25 nA). That is, the resistance value for the resistors should be selected such that Imismatch is less than five percent of Inominal. In such an example, a resistance value of 160 kiloohms (kΩ) gives an Imismatch of 6.25 nA (1 mV/160 kΩ). Since the 6.25 nA Imismatch is less than five percent of the 125 nA Inominal, the resistance value greater than 160 kΩ should suffice.

In some embodiments, as illustrated in FIG. 2, there is a connection point at or adjacent the emitter of one of the transistors for measuring the VBE of that transistor. In FIG. 2, the connection point is at the emitter of transistor Q1 and is labeled as VBE. In alternative embodiments, the connection point could be at the emitter of any one of the transistors. Notably, in accordance with embodiments of the invention, there need only be such a connection point for one of the transistors. Although not illustrated, in some embodiments the connection point VBE is coupled to the ADC 112 to enable conversion of the VBE from analog to digital for use by the measurement circuitry 118.

As mentioned above, by selecting a suitable value of resistance for the resistors, the current distribution mismatch is reduced to a level at which it can be ignored in some contexts. This can be seen in the following equations. In the example circuit of FIG. 2 with all the switches closed, the bias current can be calculated using equation (1) below:

$$Ibias = \sum_{1}^{p}\left(\frac{VC - VBEj}{R}\right), \quad (1)$$

in which Ibias is the bias current, VC is the voltage at the common node, VBEj is the base-emitter voltage at the jth transistor, and R is the resistor value (which is the same for all the resistors).

The base-emitter voltage at the jth transistor (VBEj) can be calculated using equation (2) below:

$$VBEj = VBEavg \pm \Delta j, \quad (2)$$

in which VBEavg is the average VBE for all transistors and Δj is the mismatch in VBEj around VBEavg.

Substituting the definition of VBEj from equation (2) into equation (1) leads to the definition of Ibias in equation (3) below:

$$Ibias = \sum_{1}^{p}\left(\frac{VC - VBEavg \pm \Delta j}{R}\right). \quad (3)$$

Taking the constants (VC and VBEavg) out of the summation in equation (3) leads to equation (4) below:

$$Ibias = p\left(\frac{VC - VBEavg}{R}\right) \pm \sum_{1}^{p}\frac{\Delta j}{R}. \quad (4)$$

As mentioned above, Δj is the mismatch in VBEj around VBEavg. Since the sum of variations around an average is very small and is further reduced by dividing by R in equation (4), the summation in equation (4) can be ignored. Ignoring the summation and rearranging equation (4) to solve for VC leads to equation (5) below:

$$VC = VBEavg + \left(\frac{Ibias \times R}{p}\right). \quad (5)$$

The jth bias current (Ij) can be defined as shown in equation (6) below:

$$Ij = \frac{VC - VBEj}{R}. \quad (6)$$

Using the definition of VC from equation (5) and the definition of VBEj from equation (2) in equation (6) leads to equation (7) below:

$$\Rightarrow Ij = \left(\frac{Ibias}{p}\right) \pm \frac{\Delta j}{R}. \quad (7)$$

As seen in equation (7), since Δj is the mismatch in VBEj, any error in Ij due to that mismatch is suppressed by R because it is divided by R. That is, the larger the value of R, the smaller the mismatch error in Ij. As such, choosing a suitably large R can reduce the mismatch to a desired level. By having a sufficiently large value of R, the mismatch of VBEs is masked and the Ibias/p current flowing through each branch has very little mismatch error. As a result, obtaining ΔVBE at any one of the transistors gives sufficient mismatch accuracy without dynamic element matching. Generally, there is little resistor mismatch, and resistor mismatch can be further reduced (to the point of insignificance) by using resistors of sufficient width.

Figure 4:
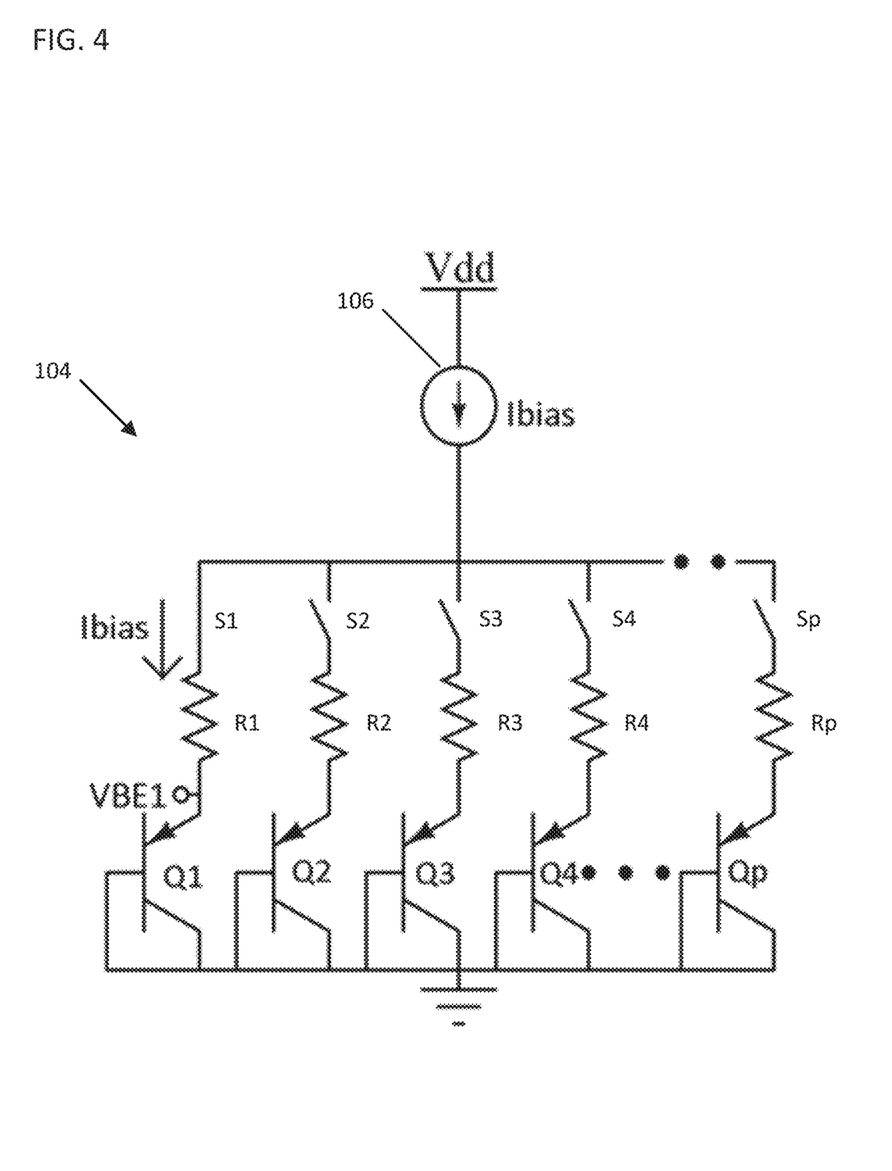
FIGS. 4 and 5 illustrate the circuit of FIG. 2 in various states of implementation of an example method for temperature measurement using a PTAT voltage, in accordance with an example embodiment of the present disclosure.
Figure 5:
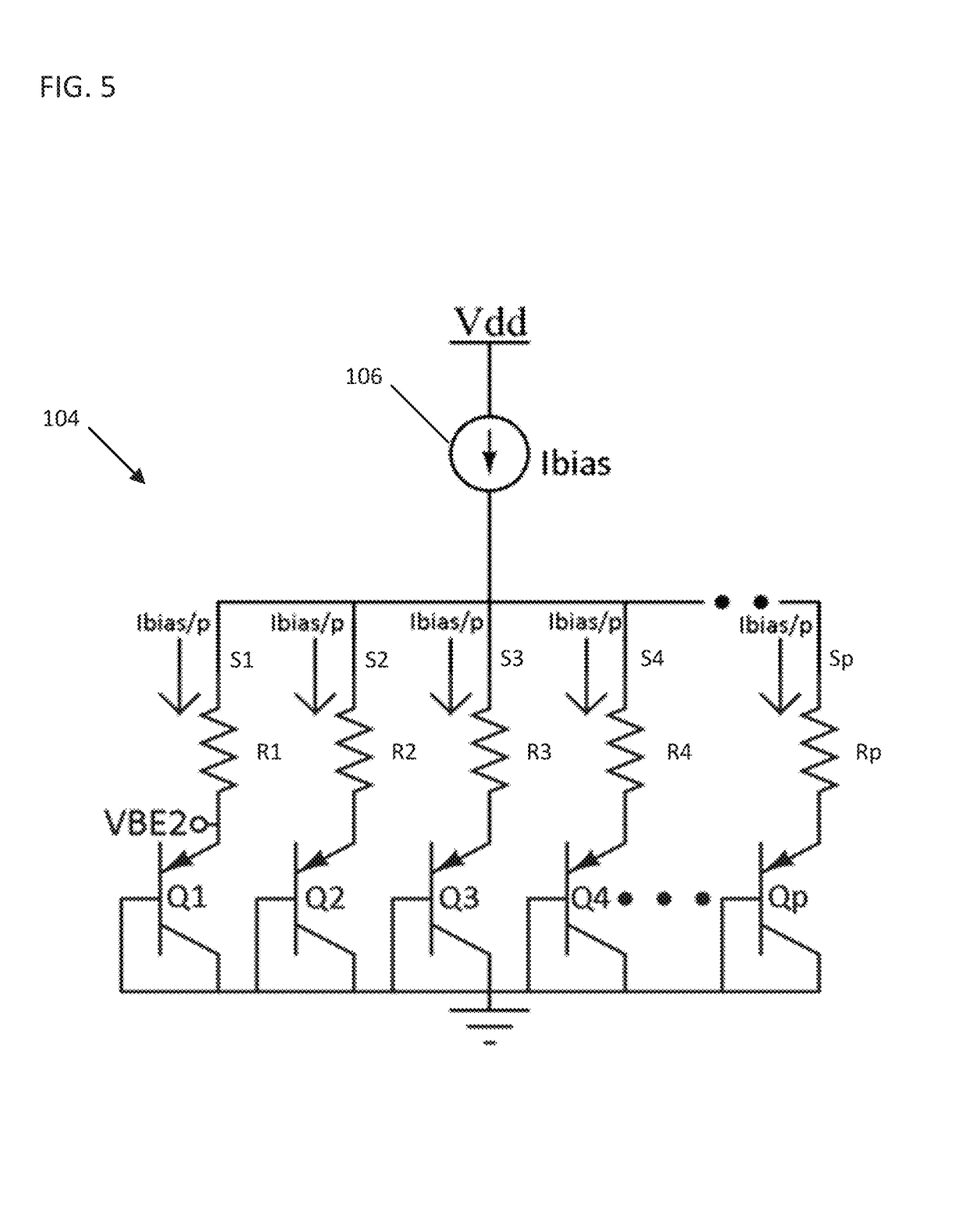

FIGS. 4 and 5 illustrate the circuit of FIG. 2 in various states of implementation of the present disclosure. The reference numbers 108, 109, and 110 are omitted from FIGS. 4 and 5 for simplicity.

Figure 3:
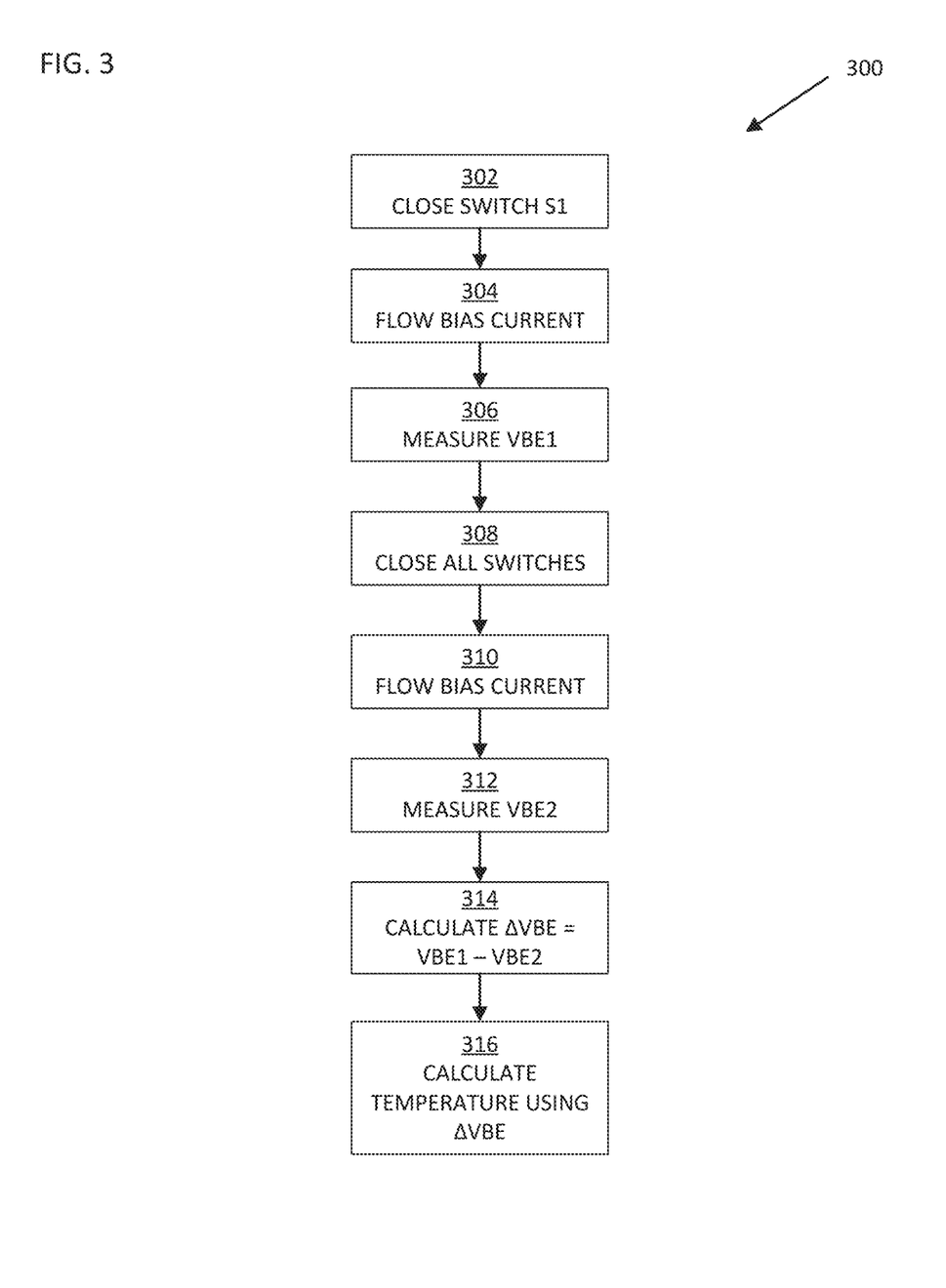
FIG. 3 is an example flow diagram illustrating an example method for temperature measurement using a PTAT voltage, in accordance with an example embodiment of the present disclosure.

Referring now to FIG. 3, an example flow diagram illustrating an example method in accordance with some embodiments of the present disclosure is provided.

It is noted that each block of the flowchart, and combinations of blocks in the flowchart, may be implemented by various means such as hardware, firmware, circuitry and/or other devices associated with execution of software including one or more programming instructions. For example, one or more of the methods described in FIG. 3 may be embodied by programming instructions, which may be stored by a non-transitory memory component of an apparatus employing an embodiment of the present disclosure and executed by one or more processing components in the apparatus. These programming instructions may direct the processing components or other programmable apparatus to function in a particular manner, such that the instructions stored in the non-transitory memory component produce an article of manufacture, the execution of which implements the function specified in the flowchart block(s).

As described above and as will be appreciated based on this disclosure, embodiments of the present disclosure may be configured as methods, devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

Referring now to FIG. 3, an example method 300 in accordance with some embodiments of the present disclosure is illustrated. In particular, the example method 300 illustrates example steps/operations of calculating a temperature using a circuit without dynamic element matching, in accordance with some embodiments of the present disclosure.

At step/operation 302, a controller (such as, but not limited to, the controller 102 of the system 100 described above in connection with FIG. 1, in conjunction with the switch control circuitry 116) causes one of the switches (S1 in this example embodiment because VBE is being measured for transistor Q1) to close while leaving all the other switches open. Referring now to FIG. 4, the circuit 104 is illustrated with switch S1 closed and all other switches (S2 through Sp) open. As noted above, in alternative embodiments VBE could be measured at any one of the transistors, in which case a different switch would be closed at this step/operation. Notably, in accordance with embodiments of the invention, VBE need only be measured for one of the transistors.

Returning now to FIG. 3, at step/operation 304, a bias current flows from the current source 106 due to the closure of switch S1. Since only switch S1 is closed at this point, the entire bias current flows through resistor R1 to transistor Q1 as illustrated in FIG. 4.

Returning now to FIG. 3, at step/operation 306, a controller (such as, but not limited to, the controller 102 of the system 100 described above in connection with FIG. 1, in conjunction with the measurement circuitry 118) measures (or samples) the base-emitter voltage at the emitter of transistor Q1. In some embodiments, this measured (or sampled and stored) VBE is termed VBE1 (and is labeled as such in FIG. 4), because it is the first VBE measurement. This VBE measurement is at a higher current density since the entire bias current flows through resistor R1 to transistor Q1.

At step/operation 308, a controller (such as, but not limited to, the controller 102 of the system 100 described above in connection with FIG. 1, in conjunction with the switch control circuitry 116) causes all switches to close. Referring now to FIG. 5, the circuit 104 is illustrated with all switches S1 through Sp closed.

Returning now to FIG. 3, at step/operation 310, a bias current flows from the current source 106 due to the closure of all switches. Since all switches are closed at this point, the bias current flows through all of the switches to all of the transistors as illustrated in FIG. 5. Since the transistors are arranged in parallel, the bias current flowing to each transistor is Ibias/p (with the mismatch advantages of this arrangement as explained before).

Returning now to FIG. 3, at step/operation 312, a controller (such as, but not limited to, the controller 102 of the system 100 described above in connection with FIG. 1, in conjunction with the measurement circuitry 118) measures (or samples) the base-emitter voltage at the emitter of transistor Q1. In some embodiments, this measured (or sampled and stored) VBE is termed VBE2 (and is labeled as such in FIG. 5), because it is the second VBE measurement. This VBE measurement is at a lower current density since the bias current flowing to each transistor is Ibias/p.

At step/operation 314, a controller (such as, but not limited to, the controller 102 of the system 100 described above in connection with FIG. 1, in conjunction with the measurement circuitry 118) calculates a ΔVBE for transistor Q1 by subtracting VBE2 from VBE1.

At step/operation 316, a controller (such as, but not limited to, the controller 102 of the system 100 described above in connection with FIG. 1, in conjunction with the measurement circuitry 118) uses ΔVBE as the PTAT voltage to calculate the temperature of the IC. The process of calculating a temperature from a PTAT voltage is conventionally known. In some embodiments, the conventionally known formula $$\Delta VBE = \frac{kT}{q}\ln(p)$$

is used to calculate the temperature T. Since k, q, and ln(p) in this formula are constants, ΔVBE is multiplied by a conventionally known scalar value and then converted from Kelvin to Celsius.

CONCLUSION

Many modifications and other embodiments of the disclosures set forth herein will come to mind to one skilled in the art to which these disclosures pertain having the benefit of teachings presented in the foregoing descriptions and the associated drawings. Although the figures only show certain components of the apparatus and systems described herein, it is understood that various other components may be used in conjunction with the system. Therefore, it is to be understood that the disclosures are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above.

Additionally, the section headings used herein are provided for consistency with the suggestions under 37 C.F.R. 1.77 or to otherwise provide organizational cues. These headings shall not limit or characterize the disclosure(s) set out in any claims that may issue from this disclosure.

While this detailed description has set forth some embodiments of the present disclosure, the appended claims cover other embodiments of the present disclosure which differ from the described embodiments according to various modifications and improvements. For example, the appended claims can cover any form of integrated circuit for which temperature measurement is desirable, such as but not limited to multi-core processors, digital signal processors, application specific integrated circuits, and the like.

Within the appended claims, unless the specific term "means for" or "step for" is used within a given claim, it is not intended that the claim be interpreted under 35 U.S.C. 112, paragraph 6.

What is claimed is:

1. An integrated circuit comprising:
    a current source;
    a plurality of transistors arranged in parallel, each of the plurality of transistors having an emitter and a base;
    a plurality of resistors, each resistor coupled with the emitter of a respective one of the plurality of transistors;
    a plurality of switches, each switch selectively coupling the current source to a respective one of the plurality of resistors such that a bias current flows from the current source to the emitter of a respective one or more of the plurality of transistors when a respective one or more of the plurality of switches is closed;
    switch control circuitry configured to, at different times, cause all of the plurality of switches to close and, separately, cause a switch associated with a first one of the plurality of transistors to close while causing all other switches to open; and
    measurement circuitry coupled to the first one of the plurality of transistors between its emitter and a respective one of the plurality of resistors, the measurement circuitry configured to separately measure a base-emitter voltage (VBE) of the first one of the plurality of transistors when all of the plurality of switches are closed and a VBE of the first one of the plurality of transistors when only the switch associated with the first one of the plurality of transistors is closed, the measurement circuitry further configured to determine a ΔVBE by calculating a difference between the VBE when only the switch associated with the first one of the plurality of transistors is closed and the VBE when all of the plurality of switches are closed.

2. The integrated circuit of claim 1, wherein the measurement circuitry is further configured to calculate a temperature based on the determined ΔVBE.

3. The integrated circuit of claim 1, wherein the measurement circuitry comprises an analog-to-digital converter for converting the determined ΔVBE from an analog value to a digital value.

4. The integrated circuit of claim 1, wherein each of the plurality of transistors comprises a bipolar junction transistor.

5. The integrated circuit of claim 4, wherein each of the plurality of bipolar junction transistor comprises a parasitic bipolar junction transistor.

6. The integrated circuit of claim 1, wherein the bias current from the current source is selected to be within an operating region of the plurality of transistors.

7. The integrated circuit of claim 1, wherein each of the plurality of resistors has a same resistance value.

8. The integrated circuit of claim 7, wherein the same resistance value is selected such that, when all of the plurality of switches are closed such that the bias current flows through all of the resistors, a difference in the bias current flowing through each one of the plurality of resistors due to a mismatch of its associated transistor is less than a threshold percentage of a nominal bias current through each one of the plurality of resistors.

9. A method for determining a temperature, the method comprising:
    for a first one of a plurality of transistors arranged in parallel, each of the plurality of transistors having an emitter and a base, the emitter of each of the plurality of transistors selectively coupled to a current source via a respective one of a plurality of switches and a respective one of a plurality of resistors such that a bias current flows from the current source to the emitter of a respective one or more of the plurality of transistors when a respective one or more switches is closed, separately measuring a base-emitter voltage (VBE) when all of the plurality of switches are closed and a VBE when only a switch associated with the first one of the plurality of transistors is closed;
    determining a ΔVBE for the first one of the plurality of transistors by calculating a difference between the VBE when only the switch associated with the first one of the plurality of transistors is closed and the VBE when all of the plurality of switches are closed; and
    calculating a temperature using the determined ΔVBE.

10. The method of claim 9, further comprising converting each of the measured VBEs from an analog value to a digital value.

11. The method of claim 9, wherein each of the plurality of transistors comprises a bipolar junction transistor.

12. The method of claim 9, wherein the bias current from the current source is selected to be within an operating region of the plurality of transistors.

13. The method of claim 9, wherein each of the plurality of resistors has a same resistance value.

14. The method of claim 13, wherein the same resistance value is selected such that, when all of the plurality of switches are closed such that the bias current flows through all of the resistors, a difference in the bias current flowing through each one of the plurality of resistors due to a mismatch of its associated transistor is less than a threshold percentage of a nominal bias current through each one of the plurality of resistors.

15. A temperature sensor comprising:
    a current source;
    a plurality of transistors arranged in parallel, each of the plurality of transistors having an emitter and a base;

a plurality of resistors, each resistor coupled with the emitter of a respective one of the plurality of transistors;

a plurality of switches, each switch selectively coupling the current source to a respective one of the plurality of resistors such that a bias current flows from the current source to the emitter of a respective one or more of the plurality of transistors when a respective one or more of the plurality of switches is closed;

switch control circuitry configured to, at different times, cause all of the plurality of switches to close and, separately, cause a switch associated with a first one of the plurality of transistors to close while causing all other switches to open; and measurement circuitry coupled to the first one of the plurality of transistors between its emitter and a respective one of the plurality of resistors, the measurement circuitry configured to separately measure a base-emitter voltage (VBE) of the first one of the plurality of transistors when all of the plurality of switches are closed and a VBE of the first one of the plurality of transistors when only the switch associated with the first one of the plurality of transistors is closed, the measurement circuitry further configured to determine a $\Delta$VBE by calculating a difference between the VBE when only the switch associated with the first one of the plurality of transistors is closed and the VBE when all of the plurality of switches are closed.

16. The temperature sensor of claim 15, wherein the measurement circuitry is further configured to calculate a temperature based on the on the determined $\Delta$VBE.

17. The temperature sensor of claim 15, wherein the measurement circuitry comprises an analog-to-digital converter for converting the determined $\Delta$VBE from an analog value to a digital value.

18. The temperature sensor of claim 15, wherein each of the plurality of transistors comprises a bipolar junction transistor.

19. The temperature sensor of claim 15, wherein the bias current from the current source is selected to be within an operating region of the plurality of transistors.

20. The temperature sensor of claim 15, wherein each of the plurality of resistors has a same resistance value; and wherein the same resistance value is selected such that, when all of the plurality of switches are closed such that the bias current flows through all of the resistors, a difference in the bias current flowing through each one of the plurality of resistors due to a mismatch of its associated transistor is less than a threshold percentage of a nominal bias current through each one of the plurality of resistors.

* * * * *